May 17, 1966 C. V. CLAYPOOL, JR 3,252,039
ELECTRIC DISCHARGE DEVICE
Filed July 23, 1962
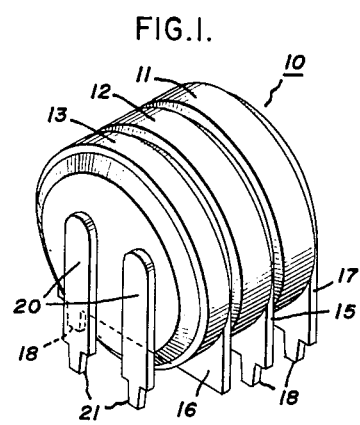
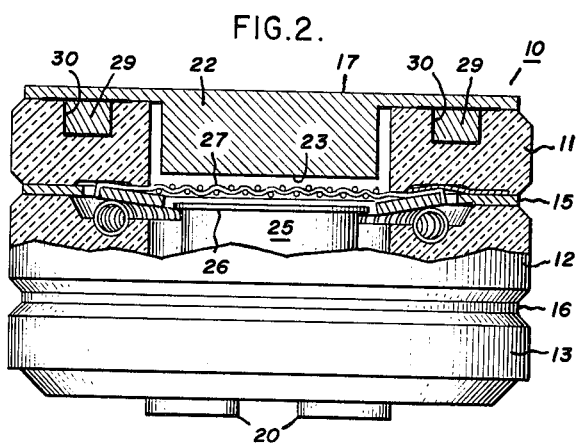
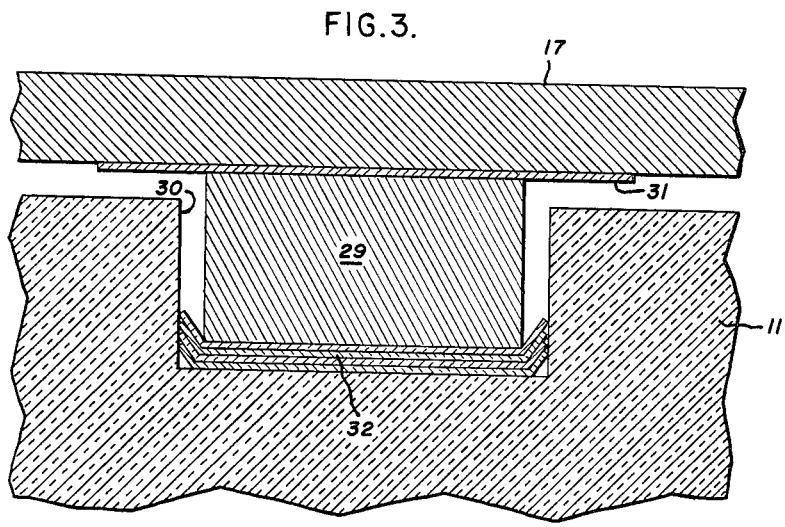
INVENTOR:
CHESTER V. CLAYPOOL, JR.
BY
HIS ATTORNEY.

United States Patent Office 3,252,039
Patented May 17, 1966

3,252,039
ELECTRIC DISCHARGE DEVICE
Chester V. Claypool, Jr., Owensboro, Ky., assignor to General Electric Company, a corporation of New York
Filed July 23, 1962, Ser. No. 211,518
1 Claim. (Cl. 313—244)

This invention relates generally to electric discharge devices and more particularly to electric discharge devices of metal and ceramic construction.

This invention represents an improvement in the construction of electric discharge devices having ceramic envelopes or structural members. Certain forms of such devices are disclosed in United States Letters Patent 2,964,664 and United States Letters Patent 3,022,440, each of which is assigned to the assignee of the present invention.

As in most electric discharge devices, those utilizing ceramic envelopes require the enveloped space to be evacuated to allow effective electron flow between electrodes during operation. This required evacuation necessitates efficient seals and, in many instances, the seals must be at joints between metal elements and ceramic elements. If the seal fails, the electric discharge device fails. For effective operation of the electric discharge device, it is necessary to heat some of the electrical elements within the device. This heat precipitates expansion of the metal elements which become heated rather rapidly due to their high heat conductivity. The ceramic elements which are contiguous with the metal elements are made from materials having thermal expansion characteristics quite similar to that of the metal elements. However, because the ceramic material does not have the high heat conductivity characteristics of the metal, the ceramic elements do not expand as rapidly as the metal elements upon initial heating of the electric discharge device. The resultant expansion differential at the seal generates stresses which tend to fracture the seal.

It is an object of this invention to provide an improved metal-to-ceramic seal for an electric discharge device.

It is also an object of this invention to provide a metal-to-ceramic seal for an electric discharge device which will withstand an expansion differential between the metal and the ceramic elements without fracturing.

It is a further object of this invention to provide an electric discharge device construction wherein excessive thermal gradients between the metal and ceramic elements are avoided.

Briefly stated, in accordance with one aspect of the invention, an electric discharge service is provided with an anode assembly having a peripheral flange. A ceramic envelope surrounds the internal elements of the electric discharge device and has an end surface in juxtaposition with the anode assembly flange. A recess is provided in the end surface of the ceramic envelope and the anode assembly flange has a depending portion extending into the recess and bonded to the envelope to provide a seal and a high-heat-conductivity path between the anode assembly and the adjacent ceramic envelope.

While the specification concludes with claim particularly pointing out and distinctly claiming the subject matter which is regarded as the invention, it is believed the invention will be better understood from the following description taken in connection with the accompanying drawings, in which:

FIG. 1 is a prespective view of an electron discharge device, having ceramic and metal elements, manufactured in accordance with the present invention;

FIG. 2 is an elevational view, partly in cross-section, of the device of FIG. 1; and FIG. 3 is an enlarged fragmentary cross-sectional view of the metal-to-ceramic seal of the present invention just prior to the final bonding step during manufacture.

Referring now to the drawings and particularly to FIGS. 1 and 2, there is illustrated an electric discharge device 10, in some respects similar to the type disclosed in the aforementioned U.S. Letters Patent 3,022,440. The electric discharge device 10 comprises a plurality of ceramic members 11, 12 and 13. Ceramic members 11 and 12 are coaxial cylindrical ceramic envelope members while member 13 provides a disk-like end wall for the envelope defined by members 11 and 12. Interposed between members 11 and 12 is a grid element contact 15, while interposed between members 12 and 13 is a cathode contact 16.

A metallic anode assembly 17 spans one end of the electric discharge device 10 and has a peripheral flange in overlying relationship with ceramic member 11. The anode assembly 17, the grid element contact 15, and the cathode contact 16 are each provided with a connecting means 18 adapted to be received by a tube socket arrangement (not shown). Extending from the ceramic member 13 are two contacts 20, for a filamentary heater for the cathode, each of which contact 20 is provided with a connecting means 21 similar to the aforementioned connecting means 18.

The anode assembly 17 includes a cylindrical anode block 22 having an active anode surface 23. The cathode contact 16 is mechanically and electrically connected to a cathode support sleeve 25 by means not shown. The cathode support sleeve 25 carries a planar cathode element 26 in spaced relation to the anode surface 23. Disposed between the anode surface 23 and the cathode element 26 is a grid element 27 supported by, and electrically connected to, the grid element contact 15. The construction of the electric discharge device 10, as thus far described, is disclosed in either of the aforementioned U.S. Patents and, per se, forms no part of the present invention.

As mentioned earlier, when an electric discharge device 10, as just described, is initially energized the metal elements heat up rapidly and undergo thermal expansion. Accordingly, although the ceramic member 11 has essentially the same thermal expansion characteristics as the anode assembly 17, it would not expand as rapidly as the anode assembly because it would not receive heat as rapidly as the anode assembly 17, nor would the heat received be in sufficient quantity to cause equivalent expansion. Because of the thermal expansion differential, excessive shear stress could be set up in the seal between the anode assembly 17 and the ceramic member 11. An improved seal is, therefore, provided between the anode assembly 17 and the ceramic member 11 to provide an extra large seal area, a compressive-type stress between the anode assembly 17 and the ceramic member 11 during heat-up and cooling as opposed to the aforementioned shear stress, and a high heat conductivity path between the anode assembly 17 and the ceramic member 11 to provide the ceramic member with more nearly the same amount of thermal expansion as that of the anode assembly.

In accordance with the invention, a metallic anode ring 29 extends into an annular recess 30 in ceramic member 11. This arrangement provides a greater seal area than an arrangement wherein the seal comprises only two contiguous planar surfaces since the seal area, in the present invention, also includes the sides of the anode ring 29. As the anode assembly 17 expands during heat-up of the electric discharge device 10, the anode ring 29 expands radially and exerts a compressive force against the outer wall of the annular recess 30. The compressive forces thus generated prevent the expensive forces of the anode assembly 17 from exerting significant shear stress at those portions of the seal area which lie in a plane normal to the longitudinal axis of the electric discharge device 10. The anode ring 29 also serves as a high heat conductivity path to heat up the ceramic member 11 at more nearly the same rate as the anode assembly 17. Since the ceramic material, from which member 11 is manufactured, has thermal expansion characteristics similar to those of the material from which the anode assembly 17 is manufactured, the high heat conductivity path tends to lessen the expansion differential between the anode assembly 17 and ceramic member 11.

Referring now to FIG. 3, a detailed exploded illustration, drawn to an enlarged scale, of the improved seal is shown. The anode assembly 17 may have an annular anode shim 31 of suitable bonding material, such as nickel, disposed between the anode assembly 17 and the anode ring 29. The anode ring 29 is shown extending into the recess 30 and resting on a plurality of bonding shims 32 which are adjacent the bottom of the recess 30. The bonding shims 32 may be of any suitable ceramic-to-metal bonding material such as, for example, nickel. The arrangement shown in FIG. 3 is that which obtains immediately prior to the insertion of the device into a jig (not shown) which will exert a compressive force tending to squeeze the anode assembly 17 toward the ceramic member 11. This squeezing action is preferably conducted in a vacuum at a temperature of approximately 975° C. The squeezing action at that elevated temperature causes the aforementioned shims 31 and 32 to fuse with both the ceramic member 11 and the metallic members 29 and 17. This fusion causes the shims 31 and 32 to completely fill the cavity between the walls of the recess 30 and the anode ring 29.

The structure as described obviously affords a large seal area in that the seal area comprises three sides of the anode ring 29 as well as the entire end surface of the ceramic member 11. Also, the present invention provides a compressive stress in the seal area rather than shear stress whenever there is a differential in thermal expansion between the anode assembly 17 and the ceramic member 11. Furthermore, the anode ring 29, by extending into the recess 30, provides a high heat conductivity path from the anode assembly 17 into the body of the ceramic member 11 which tends to minimize any thermal differential between the anode assembly 17 and the ceramic member 11.

As will be evident from the foregoing description, certain aspects of the invention are not limited to the particular details of construction of the example illustrated, and it is contemplated that various and other modifications or applications will occur to those skilled in the art. For example, the seal has been described for employment between the anode assembly 17 and the ceramic member 11; however, the seal would be equally applicable between either of the contacts 15 and 16 and their adjacent ceramic members 11, 12, or 13. Furthermore, the portion of the anode assembly 17 which extends into the ceramic member 11 has been described as a ring; however, it would be possible to achieve the high heat conductivity characteristics of the invention as well as an effective shear stress minimization by making the depending portion of the anode assembly 17 segmental with spaced portions extending into the ceramic member 11. Also, the anode ring 29 could be effectively replaced by an element having a configuration other than annular, e.g., a polygonal element. Moreover, it would be equally feasible to have the anode ring 29 integral with the anode assembly 17. It is, therefore, intended that the appended claim shall cover such modifications and applications as do not depart from the true spirit and scope of the invention.

What is claimed is new and desired to be secured by Letters Patent of the United States is:

In an electron discharge device, the combination comprising a cylindrical ceramic envelope having an end surface and an annular recess in said end surface; an anode assembly, said ceramic envelope and said anode assembly having substantially the same thermal expansion characteristics, said anode assembly having a central block portion, an active surface for receiving electrons on said block portion, and a peripheral flange portion surrounding said block portion; and means for providing a high heat conductivity seal between said anode assembly and said envelope including an anode ring depending from said peripheral flange and extending into said annular recess and bonded to the walls of said recess and said peripheral flange overlying and bonded to said end surface of said envelope.

References Cited by the Examiner

UNITED STATES PATENTS

| | | | |
|---|---|---|---|
| 2,215,798 | 9/1940 | Schedel | 174—50.63 |
| 2,365,518 | 12/1944 | Berkey et al. | 813—250 |
| 2,402,927 | 6/1946 | Stupakoff | 174—152 |
| 2,476,060 | 7/1949 | Moss | 313—250 |
| 2,663,824 | 12/1953 | Boyer et al. | 313—289 |
| 2,918,596 | 12/1959 | Dijksterhuis et al. | 313—250 |
| 3,022,440 | 2/1962 | Soileau | 313—250 |

JOHN W. HUCKERT, *Primary Examiner.*

JAMES D. KALLAM, *Examiner.*

A. J. JAMES, C. E. PUGH, *Assistant Examiners.*